United States Patent [19]

Kruckenberg et al.

[11] 4,292,239
[45] Sep. 29, 1981

[54] BENZISOTHIAZOLE AZO DYESTUFFS CONTAINING POLYETHER GROUPS

[75] Inventors: Winfried Kruckenberg; Karl H. Schündehütte, both of Leverkusen, Fed. Rep. of Germany

[73] Assignee: Bayer Aktiengesellschaft, Leverkusen, Fed. Rep. of Germany

[21] Appl. No.: 65,777

[22] Filed: Aug. 13, 1979

[30] Foreign Application Priority Data

Aug. 31, 1978 [DE] Fed. Rep. of Germany ....... 2837960

[51] Int. Cl.³ .................. C09B 29/045; C09B 29/09; C09B 29/26; D06P 3/52
[52] U.S. Cl. ................ 260/158; 260/465 D; 260/465 E; 548/163; 548/164; 564/203; 564/223; 564/441; 564/442; 564/443
[58] Field of Search ................ 260/158, 155, 152

[56] References Cited

U.S. PATENT DOCUMENTS

| | | | |
|---|---|---|---|
| 3,455,898 | 7/1969 | Seefelder et al. | 260/158 |
| 3,573,273 | 3/1971 | Seefelder et al. | 260/158 |
| 3,586,663 | 6/1971 | Kruckenberg | 260/207.1 |
| 4,051,084 | 9/1977 | Kuhlthau et al. | 260/158 |

FOREIGN PATENT DOCUMENTS

| | | | |
|---|---|---|---|
| 2654889 | 6/1977 | Fed. Rep. of Germany | 260/207 |
| 481694 | 7/1970 | Japan | 260/158 |

*Primary Examiner*—Floyd D. Higel
*Attorney, Agent, or Firm*—Sprung, Felfe, Horn, Lynch & Kramer

[57] ABSTRACT

Dyestuffs of the formula

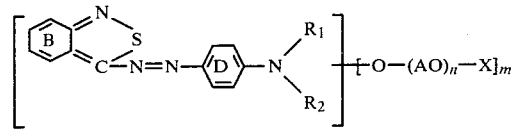

wherein
$R_1$ represents hydrogen, alkyl or aralkyl,
$R_2$ represents $R_1$ or aryl,
A represents $C_2$–$C_6$-alkylene,
X represents $R_2$ or acyl,
n represents 1–7,
m represents 1 or 2 and
the rings B and D can contain customary radicals,
with the proviso that n is at least 2 if X represents acyl, give, when mixed with emulsifiers, dyestuff preparations which are in the liquid or dissolved form under dyeing conditions. The use of additional dispersing agents, protective colloids, levelling agents and carriers when dyeing polyester fibres thereby becomes superfluous.

2 Claims, No Drawings

BENZISOTHIAZOLE AZO DYESTUFFS CONTAINING POLYETHER GROUPS

The invention relates to dyestuffs of the formula

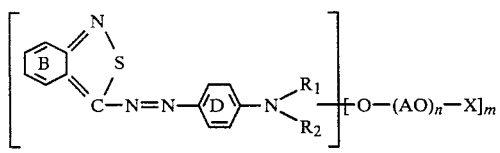
(I)

wherein $R_1$ represents hydrogen or optionally substituted alkyl or aralkyl, $R_2$ represents $R_1$ or optionally substituted aryl, A represents $C_2$–$C_6$-alkylene, X represents $R_2$ or acyl, n represents a number from 1 to 7, m represents 1 or 2 and the rings B and D can contain non-ionic radicals customary in the chemistry of azo dyestuffs or a COOH group, with the proviso that n is at least 2 if x represents acyl.

Suitable non-ionic radicals are those such as are contained in the preferred dyestuffs indicated below.

Examples which may be mentioned are alkyl, alkoxy, halogen, acylamino, alkylcarbonyl and alkoxycarbonyl, and for ring B also $NO_2$ and CN.

Preferred dyestuffs are those of the formula

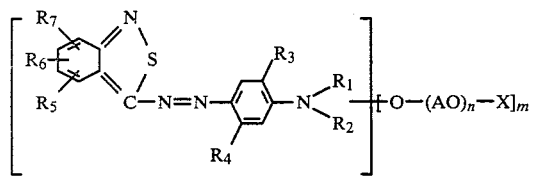
(II)

wherein $R_1$, $R_2$, A, X, m and n have the abovementioned meaning, $R_3$ represents H, alkyl, alkoxy or halogen, $R_4$ represents $R_3$ or acylamino, $R_5$ represents H, alkyl or halogen, $R_6$ represents $R_5$, CN or $NO_2$ and $R_7$ represents $R_5$, CN, alkoxy, alkoxycarbonyl or alkylcarbonyl, and wherein the radical $-O-(AO)_n-X$ preferably represents the alkoxy radicals $R_3$, $R_4$ and/or $R_7$ or is bonded to the hydrocarbon radicals $R_1$ and/or $R_2$.

Suitable alkyl radicals $R_1/R_2$ are those with 1–4 C atoms, which can be substituted by a CN, OH, alkoxy, alkoxycarbonyl, alkylcarbonyloxy or alkoxycarbonyloxy group or halogen.

Other suitable alkyl radicals are preferably unsubstituted and have 1–4 C atoms.

Suitable alkoxy radicals mentioned in any connection (that is to say, for example, also alkoxycarbonyl radicals) likewise have 1–4 C atoms.

By "halogen" in the scope of this invention there is to be understood, above all, F, Br and, in particular, Cl.

Suitable aryl radicals in any case are, above all, phenyl radicals, which can be monosubstituted, disubstituted or trisubstituted by halogen, alkoxy or alkyl.

Suitable aralkyl radicals in any case are, in particular, benzyl and phenylethyl radicals, it being possible for the phenyl radicals to be substituted as described above.

Suitable acyl radicals in any case are alkylcarbonyl, alkoxycarbonyl, alkylsulphonyl, arylcarbonyl and arylsulphonyl.

Suitable acylamino radicals are those of the formula NQ-acyl, Q denoting H or $CH_3$, and sulphamoyl, as well as formylamino.

Suitable alkylene radicals are, above all $$-CH_2CH_2- \text{ and } -(CH_2)_4-.$$

Particularly preferred dyestuffs are those of the formula II wherein $R_1$ represents H, $C_1$–$C_4$-alkyl, $C_1$–$C_4$-alkyl-T or $C_1$–$C_4$-alkyl-W, $R_2$ represents $C_1$–$C_4$-alkyl or $C_1$–$C_4$-alkyl-W, $R_3$ represents H, methyl, ethyl, methoxy, ethoxy or Cl, $R_4$ represents $R_3$, formylamino or $C_1$–$C_4$-alkylcarbonylamino which is optionally substituted by $C_1$–$C_2$-alkoxy, $R_5$ represents H, methyl, Cl or Br, $R_6$ represents $R_5$, CN or $NO_2$ and $R_7$ represents $R_5$, CN, methoxy, $C_1$–$C_2$-alkylcarbonyl, $C_1$–$C_2$-alkoxycarbonyl or W, wherein T represents OH, $OCH_3$ or CN and W represents $-O-A'O)_n-X'$, wherein A' denotes $C_2$- to $C_4$-alkylene and X' denotes H, $C_1$–$C_4$-alkyl, phenyl, $C_2$–$C_4$-chloroalkyl, cyanoethyl, $C_1$–$C_4$-alkylcarbonyl or benzoyl, with the proviso that the dyestuff contains at least one radical W and n is at least 2 if X' denotes alkylcarbonyl.

Dyestuffs of the formula III

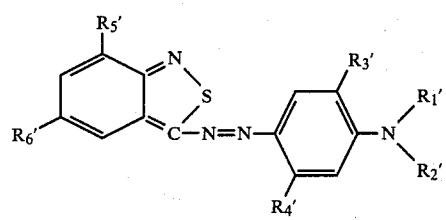
(III)

wherein $R'_1$–$R'_5$ have the meaning indicated above for $R_1$–$R_5$ and

W represents $W'=O(C_2H_4O)_rX''$, wherein r denotes 1–5 and $X''$ denotes H, $C_2$–$C_4$-alkyl which is optionally substituted by CN or Cl, or methyl, are very particularly preferred.

Amongst these, those dyestuffs of the formula IV and V are in turn preferred: dyestuffs of the formula

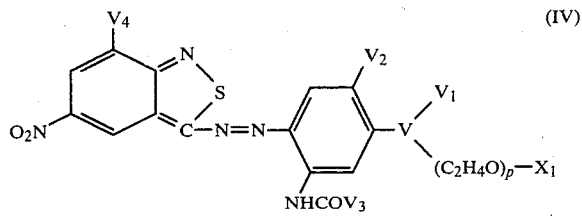

(IV)

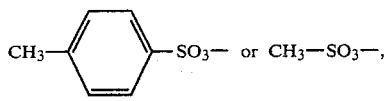

wherein
$V_1$ denotes H, methyl or ethyl,
$V_2$ denotes H, methyl, methoxy or ethoxy,
$V_3$ denotes H, methyl, ethyl, methoxymethyl or ethoxymethyl,
$V_4$ denotes H, Cl or Br,
$X_1$ denotes $C_1$-$C_4$-n-alkyl and
p denotes the numbers 3–6; dyestuffs of the formula

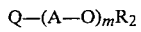

(V)

wherein
$X_1$ and $V_4$ have the abovementioned meaning,
$U_1$ denotes hydrogen, methoxyethyl, ethoxyethyl or, preferably, methyl or ethyl,
$U_2$ denotes methyl, methoxy or, preferably, hydrogen,
$U_3$ denotes methoxy or, preferably, methyl or hydrogen and
q denotes the numbers 4–6.

The new dyestuffs are obtained, for example, by a process in which diazotised benzisothiazolamines of the formula

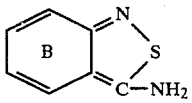

(VI)

are coupled to anilines of the formula

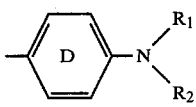

(VII)

wherein
B, D, $R_1$ and $R_2$ have the abovementioned meaning, and wherein at least one of the compounds VI and VII contains a radical of the formula $-O-(AO)_n-X$, having the meaning indicated above.

The compounds of the formula VI without this radical are known (compare, for example, DE-OS (German Published No.) 1,644,051 = British No. 1,208,986).

The compounds of the formula VII are also generally known, also with this radical.

The new compounds VI and VII with these radicals are obtained in a manner which is in itself known by reacting corresponding NH or OH compounds are reacted with compounds of the formula $$Q-(A-O)_mR_2 \qquad (VIII)$$

wherein
Q represents halogen, preferably Cl, or $$CH_3-\phantom{X}-SO_3- \text{ or } CH_3-SO_3-,$$

in a manner which is in itself known.

The compounds of the formula VIII are known, or they are readily accessible by known methods (compare DT-OS (German Published No. 1,544,599, page 22), for example by oxyalkylating compounds of the formula $R_2OH$, subjecting the reaction product to fractional distillation, replacing the terminal OH group of the particular fraction by the radical Q (for example by reaction with $SOCl_2$ or methanesulphonyl chloride) and if appropriate distilling the product again for the purpose of removing decomposition products.

The new dyestuffs are outstandingly suitable for dyeing and printing synthetic fibre materials, in particular those of aromatic polyesters and cellulose esters, on which they produce dyeings with good general fastness properties, in particular good fastness to sublimation, washing and light.

It is particularly advantageous to employ the dyestuffs in the form of liquid or pulverulent preparations which contain, in addition to the dyestuff, emulsifying polar/non-polar compounds and, if appropriate, formulating agents and extenders (in particular inorganic salts, such as NaCl and $Na_2SO_4$).

These preparations are distinguished by very high solubility in cold water.

In general, a molar ratio of dyestuff to emulsifier of 1:0.1 to 1:4 has proved advantageous; a ratio of 1:1 to 1:3 is preferred, an excess of emulsifier in general not being harmful. In practice, however, an excess of one mol is generally completely sufficient.

The production of the dyeing preparations is not linked with particularly pre-requisites with regard to apparatus. Spray-drying, drum drying or drying in a Venuleth apparatus are just as suitable as simple drying on a metal sheet, after combination of the components in normal kettles, or a combination of adduct formation and drying in the abovementioned apparatuses. It is particularly advantageous to mix the filter press-cake or the oily or pasty dyestuff, such as is obtained directly in the production, with the emulsifiers and if appropriate to convert the mixture into the dry pulverulent form in a manner which is known. The fact that no expensive fine comminution devices, such as bead mills and vibratory mills, have to be employed during any comminution of the dyestuff/emulsifier mixture, but that coarse grinding down to average particle sizes of not less than $50\mu$ is completely adequate should be singled out.

A summary of suitable emulsifiers can be found in Table 1 in "Tenside Detergents", year 11, 1974, volume 4, page 186.

Preferred polar/non-polar compounds correspond to the general formula $$G-L \qquad (IX)$$

wherein

G represents an aliphatic carbon radical with at least 10 C atoms and

L represents —SO$_3$H, —O—SO$_3$H or OPO$_3$H$_2$, or the corresponding salts.

Examples which may be mentioned are: fatty acid soaps, such as sodium laurate, sodium oleate, sodium linoleate, ammonium ricinoleate, oleic acid esters of sodium isethionate or sodium palmitate, sodium bis(2-ethylhexyl)sulphosuccinate, sodium N-methyl-N-oleyl-taurate, β-(tert.-octylphenoxy)-diethyl ether-(β'-Na sulphonate), sodium isododecylbenzenesulphonate, sodium dodecyl sulphate, sodium N-oleylsulphanilate, dodecyl-phosphonic acid, sodium dodecylbenzimidazolesulphanate, alkoxy-aryl sulphates, alkylsulphaminoaryl compounds, dodecylphenol sulphate, dodecylbenzenesulphamic acid, dibutylnaphthol sulphate and dioctylnaphthol sulphate. Cationic surface-active agents which may be mentioned are dodecylamine acetate, dodecylbenzyldimethylammonium chloride and heptadecyl N-aminoethyl)-imidazoline-acetate.

The new dyeing preparations are in the liquid or dissolved form under dyeing or printing conditions. In most cases, use of additional surface-active agents, such as dispersing agents, protective colloids or levelling agents, or also of carriers during dyeing and printing thereby becomes superfluous.

In the examples which follow, "parts" denote parts by weight.

EXAMPLE I 9.8 parts of 5-nitro-3-amino-2,1-benzisothiazole are dissolved at 10° C. in 65 parts by volume of concentrated sulphuric acid at 10° to 15° C. 50 parts of a glacial acetic acid/propionic acid mixture (17:3) are added dropwise to this solution at 0° to 5° C., whilst cooling. Thereafter, 9 parts by volume of nitrosylsulphuric acid (100 parts by volume corresponding to 42 parts of sodium nitrite) are added dropwise and the mixture is stirred at 0° to 5° C. for about 3 hours. Thereafter, 0.5 part of urea is added, 17.6 parts of the amine of the formula

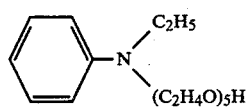

dissolved in 50 parts by volume of glacial acetic acid/propionic acid (17:3), are then added dropwise, whilst stirring and cooling, and the mixture is subsequently stirred for half an hour, stirred into ice-water and buffered rapidly with sodium acetate and sodium hydroxide solution. The dyestuff formed, of the formula

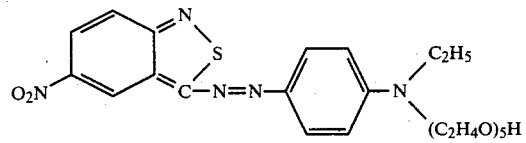

is separated off and washed with water.

When stirred intensively for a relatively long time with about twice the amount by weight of an approximately 50% strength, hot aqueous solution of a technical mixture of fatty alcohol sulphates, the dyestuff dissolves readily in a warm dyebath, with which dyeing can then be carried out in the customary manner. Polyester fibres, for example, are dyed in reddish-tinged blue shades with good fastness properties using such a dyebath.

EXAMPLE II 11.7 parts of 5-nitro-2-amino-3-chloro-benzoic acid thioamides are introduced into 110 parts of sulphuric acid monohydrate. The mixture is then warmed to 80° C. and stirred for 5 hours at 80° C., whilst passing air through. 50 parts of a glacial acetic acid/propionic acid mixture (17:3) are then added dropwise at 0° to 5° C., whilst cooling. Thereafter, 9 parts by volume of nitrosylsulphuric acid are added dropwise at below 0° C. After stirring the mixture at 0° to 5° C. for 3 hours, 0.5 part of urea is added. A solution of 16 parts of the amine of the formula

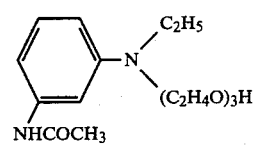

in 50 parts by volume of glacial acetic acid/propionic acid (17:3) is then added dropwise, whilst stirring and cooling, and the mixture is subsequently stirred for half an hour, stirred into ice-water and buffered rapidly with sodium acetate and sodium hydroxide solution. The dyestuff formed, of the formula

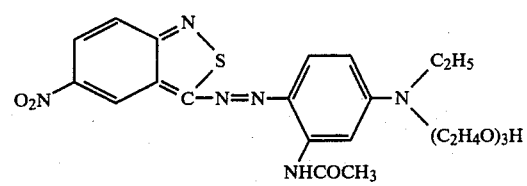

is separated off and washed with water.

When treated with a fatty alcohol sulphate as in Example 1, the dyestuff readily dissolves in a warm dyebath, from which a polyester fibre, for example, can then be dyed in the customary manner. A greenish-tinged blue dyeing with good fastness properties is obtained.

| No. | Diazo component | Coupling component | Colour shade on polyester |
|---|---|---|---|
| 1 | 3-NO₂, 6-COO(C₂H₄O)₅CH₃ benzisothiazole-3-amine | C₆H₅-N(C₂H₄OCH₃)(C₂H₄OH) | blue |
| 2 | 5-Cl benzisothiazole-3-amine | 3-NHCOCH₃-C₆H₄-N(C₂H₅)((C₂H₄O)₃₋₅CH₃) | dark blue |
| 3 | 5-CN benzisothiazole-3-amine | ″ | dark blue |
| 4 | 5-Cl benzisothiazole-3-amine | C₆H₅-N(C₂H₅)((C₂H₄O)₄₋₇CH₃) | claret |
| 5 | 5,7-(CH₃)₂ benzisothiazole-3-amine | C₆H₅-N(C₂H₄CN)((C₂H₄O)₆CH₃) | ruby |
| 6 | 5-NO₂, 7-CN benzisothiazole-3-amine | 3-CH₃-C₆H₄-N(C₂H₄OC₂H₅)(C₄H₈O(C₂H₄O)₅CH₃) | greenish-tinged blue |
| 7 | 5-Cl benzisothiazole-3-amine | C₆H₅-N(C₂H₄O₃CH₃)((C₂H₄O)₅C₂H₄Cl) | claret |
| 8 | ″ | C₆H₅-N(C₂H₅)((C₂H₄O)₅SO₂CH₃) | claret |
| 9 | 5-Cl benzisothiazole-3-amine | 2,5-(OCH₃)₂-C₆H₃-N(CH₃)((C₂H₄O)₅C₂H₄CN) | red-violet |
| 10 | 5-CN, 7-CH₃ benzisothiazole-3-amine | 3-CH₃-C₆H₄-N(C₂H₄OCOCH₃)((C₂H₄O)₅COCH₃) | violet |
| 11 | ″ | 3-Cl-C₆H₄-N(C₂H₅)((C₂H₄O)₄H) | violet |
| 12 | 5-NO₂ benzisothiazole-3-amine | 4-CH₃, 3-NHCOCH₃-C₆H₃-NH(C₂H₄O)₃CH₃ | greenish-tinged blue |
| 13 | 5-NO₂ benzisothiazole-3-amine | 3-CH₃-C₆H₄-NH(C₂H₄O)₄H | black |
| 14 | 5-NO₂, 7-Br benzisothiazole-3-amine | 3,5-(CH₃)₂-C₆H₃-NH(C₂H₄O)₅CH₃ | dark blue |

-continued
| No. | Diazo component | Coupling component | Colour shade on polyester |
|---|---|---|---|
| 15 | " | 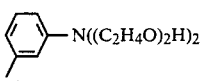 | greenish-tinged blue |
| 16 | " | 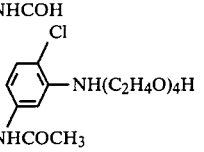 | blue |
| 17 | 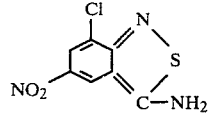 | 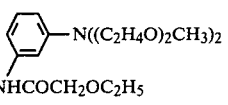 | greenish-tinged blue |
| 18 | " | 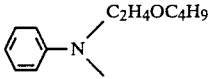 | blue |
| 19 | " | 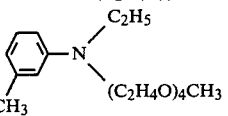 | blue |
| 20 | " | 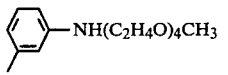 | dark blue |
| 21 | 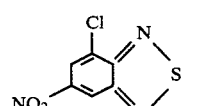 | 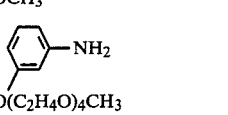 | reddish-tinged blue |
| 22 | " | 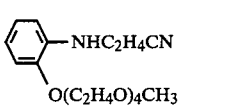 | reddish-tinged blue |
| 23 | " | 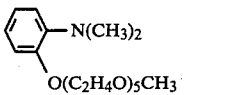 | blue |
| 24 | " | 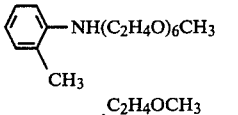 | dark blue |
| 25 | 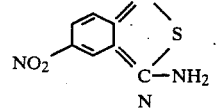 | 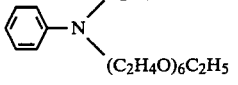 | reddish-tinged blue |
| 26 | 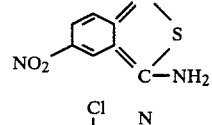 | 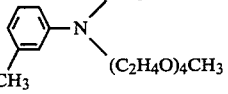 | reddish-tinged blue |
| 27 | 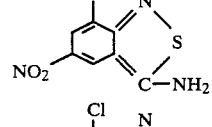 | 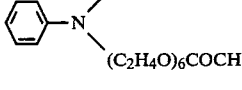 | reddish-tinged blue |
| 28 | 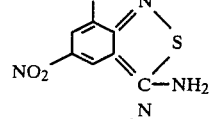 | 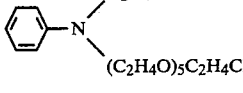 | navy blue |
| 29 | 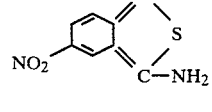 | 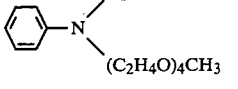 | blue |

-continued

| No. | Diazo component | Coupling component | Colour shade on polyester |
|---|---|---|---|
| 30 | " | C6H5-NH-C6H4-O(C2H4O)6H | reddish-tinged blue |
| 31 | " | 3,5-(CH3)2-C6H3-N(CH3)(C2H4O)3H | blue |
| 32 | " | 2-OCH3, 4-NH(C2H4O)3CH3, 5-NHCOC2H5 phenyl | blue-green |
| 33 | 3-Cl, 5-NO2-benzoisothiazol-2-yl (C-NH2) | 2-OCH3, 4-NH(C2H4O)5C2H5, 5-NHCOCH3 phenyl | blue-green |
| 34 | " | 3-NHCOCH3-C6H3-N(CH3)(C2H4O)2H | greenish-tinged blue |
| 35 | 3-Cl, 5-NO2-benzoisothiazol-2-yl (C-NH2) | 3-NHCOCH3-C6H3-N(C2H5)(C2H4O)4CH3 | greenish-tinged blue |
| 36 | " | 3-NHCOCH3-C6H3-N(C2H4OH)(C2H4O)3CH3 | greenish-tinged blue |
| 37 | 3-Cl, 5-NO2-benzoisothiazol-2-yl (C-NH2) | 3-NHCOCH3-C6H3-N(C2H4OC2H4OCH3)(C2H4O)3C2H5 | greenish-tinged blue |
| 38 | 5-NO2-benzoisothiazol-2-yl (C-NH2) | 3-NHCOCH3-C6H3-N(C2H5)(C2H4O)3-5CH3 | greenish-tinged blue |
| 39 | " | C6H5-N(CH3)(C4H8O)2(C2H4O)3CH3 | greenish-tinged blue |
| 40 | 5-O2N-benzoisothiazol-2-yl (C-NH2) | 2-Cl, 4-NH(C2H4O)4CH3, 5-NHCOCH3 phenyl | blue |
| 41 | 3-Cl, 5-O2N-benzoisothiazol-2-yl (C-NH2) | 2-Cl, 4-NH(C2H4O)4-5CH3, 5-NHCOCH2OCH3 phenyl | blue |

We claim:
1. A dyestuff of the formula

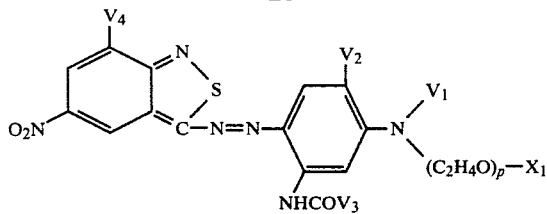
wherein
- $V_1$ is H, methyl or ethyl,
- $V_2$ is H, methyl, methoxy, ethoxy, or Cl,
- $V_3$ is H, methyl, ethyl, methoxymethyl or ethoxymethyl,
- $V_4$ is H, Cl or Br,
- $X_1$ is $C_{1-4}$-n-alkyl, and
- p is from 3 to 6.
2. A dyestuff of the formula
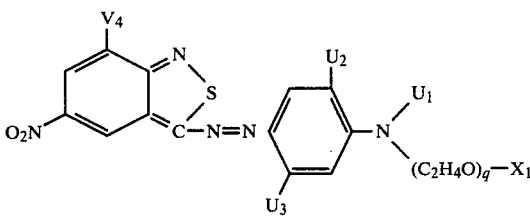
wherein
- $U_1$ is hydrogen, methoxyethyl, ethoxyethyl, methyl or ethyl,
- $U_2$ is methyl, methoxy or hydrogen,
- $U_3$ is methoxy, methyl or hydrogen,
- $X_1$ is $C_{1-4}$-n-alkyl, and
- q is 4, 5 or 6.
* * * * *